(12) United States Patent
Stephens, Jr. et al.

(10) Patent No.: US 10,311,156 B2
(45) Date of Patent: Jun. 4, 2019

(54) INFORMATION ASSOCIATION AND SUGGESTION

(71) Applicant: Comcast Cable Communications, LLC, Philadelphia, PA (US)

(72) Inventors: James Howard Stephens, Jr., Austin, TX (US); Derek Russell McGowan, San Jose, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 14 days.

(21) Appl. No.: 13/908,596

(22) Filed: Jun. 3, 2013

(65) Prior Publication Data

US 2014/0358933 A1 Dec. 4, 2014

(51) Int. Cl.
*G06F 17/30* (2006.01)

(52) U.S. Cl.
CPC .. *G06F 17/30321* (2013.01); *G06F 17/30303* (2013.01)

(58) Field of Classification Search
CPC ......... G06F 17/30864; G06F 17/30321; G06F 17/30613; G06F 17/30961; G06F 17/30067
USPC ......................... 707/741, 737, 808, 738, 696
See application file for complete search history.

(56) References Cited

U.S. PATENT DOCUMENTS

| | | | |
|---|---|---|---|
| 8,661,002 B2* | 2/2014 | Smith et al. .................. | 707/694 |
| 2006/0184584 A1* | 8/2006 | Dunn et al. ................... | 707/200 |
| 2009/0106242 A1* | 4/2009 | McGrew et al. ................. | 707/6 |
| 2010/0161603 A1* | 6/2010 | Caceres ............ | G06F 17/30539 707/736 |
| 2010/0274815 A1* | 10/2010 | Vanasco ........................ | 707/798 |
| 2011/0106857 A1* | 5/2011 | Besombe ............... | G06Q 10/10 707/803 |
| 2012/0089606 A1* | 4/2012 | Eshwar et al. ................. | 707/737 |
| 2012/0096523 A1* | 4/2012 | Ollila et al. ....................... | 726/5 |
| 2012/0117036 A1* | 5/2012 | Lester et al. ................... | 707/692 |
| 2012/0197862 A1* | 8/2012 | Woytowitz ........ | G06F 17/30731 707/710 |
| 2013/0041912 A1* | 2/2013 | Arora et al. ................... | 707/769 |
| 2013/0054598 A1* | 2/2013 | Caceres ......................... | 707/737 |
| 2013/0110907 A1* | 5/2013 | Sherwin et al. .............. | 709/203 |
| 2013/0262481 A1* | 10/2013 | Bhandari et al. ............. | 707/750 |
| 2014/0180826 A1* | 6/2014 | Boal ........................... | 705/14.66 |
| 2014/0358932 A1* | 12/2014 | Brown et al. .................. | 707/741 |

* cited by examiner

*Primary Examiner* — James Trujillo
*Assistant Examiner* — Aida Z Tessema
(74) *Attorney, Agent, or Firm* — Ballard Spahr LLP

(57) ABSTRACT

Methods and systems for processing, analyzing, and managing information are disclosed. An example method can comprise receiving at least two data groups. Each of the at least two data groups can comprise one or more values. An example method can also comprise associating the at least two data groups based on a first value being in each of the at least two data groups. Associating the at least two data groups can comprise iteratively performing a union operation on the at least two data groups. An example method can further comprise providing a suggestion to add a second value from one data group of the at least two data groups to another data group of the at least two data groups.

20 Claims, 6 Drawing Sheets

INFORMATION ASSOCIATION AND SUGGESTION

BACKGROUND

Data storage can be used for storing a variety of information. Multiple users may store information relevant to the same subject, topic, or entity in data storage. This information can be different in many ways but similar in others. Thus, there is a need for more sophisticated methods and systems for analyzing differences and similarities of information.

SUMMARY

It is to be understood that both the following general description and the following detailed description are exemplary and explanatory only and are not restrictive, as claimed. Provided are methods and systems for analyzing information. In one aspect, an example method can comprise receiving at least two data groups. Each of the at least two data groups can comprise one or more values. The at least two data groups can be associated based on a first value being in each of the at least two data groups. In one aspect, associating the at least two data groups can comprise iteratively performing a union operation on the at least two data groups. Furthermore, a suggestion to add a second value from one data group of the at least two data groups to another data group of the at least two data groups can be provided.

In one aspect, an example method can comprise receiving a plurality of data groups comprising a first data group and a second data group. At least one of the data groups can comprise one or more values. A plurality of affiliations can be identified based on the one or more values of the plurality of data groups. The first data group can be associated with the second data group based on a value in the first data group being equivalent to a value in the second data group. A suggestion can be provided to a user associated with the first data group to add at least one value from the second data group to the first data group. In one aspect, the suggestion can be based on the first data group and the second data group being associated with the same affiliation of the plurality of affiliations.

Additional advantages will be set forth in part in the description which follows or may be learned by practice.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
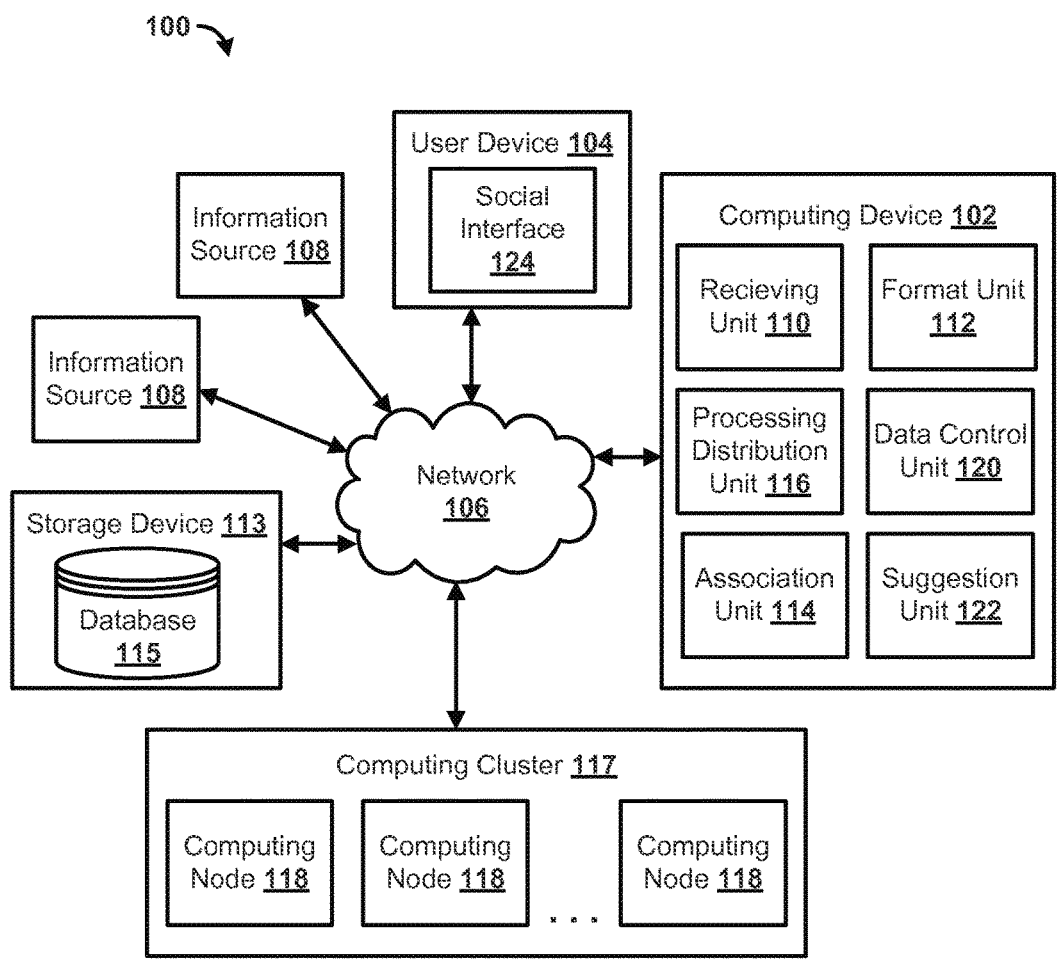
FIG. 1 is a block diagram illustrating an example system for analyzing information.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for analyzing information. Specifically, contact information can be analyzed to find common connections and provide suggestions for updating contact information. For example, common values can be used to identify when multiple address book entries comprise data values referring to the same person or entity. If some of these matching address book entries are missing values (e.g., based on a comparison the other matching address book entries), then a suggestion can be provided to add the missing values. More generally, information can be gathered from a variety of sources, such as directories, contact lists, web documents, and the like. The information can be organized into data groups. Some of the data groups can be associated with each other based on the data groups comprising one or more equivalent values. In one aspect, the association of these groups can be delegated to and performed on a plurality of computers.

Those skilled in the art will appreciate that present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be implemented by one or more computing device 102, user device 104, or computing cluster 117, or other device.

FIG. 1 is a block diagram illustrating an example system 100 for analyzing information. In one aspect, the system 100 can comprise a computing device 102 configured to manage information. In one aspect, the computing device 102 can suggest information to the user device 104. The computing device 102 can be a server or other similar device.

The computing device 102 can receive information through a network 106 from one or more information sources 108. For example, the information sources 108 can comprise one or more databases configured to store various types of information. As a few examples, information can comprise social data, demographics, contact information, job information, and the like. In another aspect, the information can comprise a plurality of data values. The information can also comprise associations within the information. For example, the data values can be organized into a plurality of data groups. The data values can be associated together based on each of the data values having an association in common with another data value. The data values can be associated as a data group based on an information source 108 associated with the data values. As a further example, contact information can comprise a name associated with an electronic address, phone number, physical address, fax number, company name, and the like. Social data can comprise social network identities associated with other social network identities, interactions between the social network identities, social network profile information, and the like. Job information can comprise a name associated with one or more companies, job titles, group affiliations, associations with coworkers, office location, and the like.

In one aspect, the data values can comprise data associated with data fields. For example, in an exemplary data value "PH:2128675309," the "PH" can represent a field, such as a phone number, and the "2128675309" can be a data value comprising the phone number. In one aspect, data values comprising fields associated with data can be referred to as handles. In one aspect, the data groups can be stored as tuples. An example tuple can comprise a set of handles. The data values can comprise personal data or other information. For example, data fields can comprise emails (e.g., "E"), websites "Website"), physical addresses (e.g., "Address"), titles (e.g., "Title"), and the like. In another aspect, the data values can comprise affiliation information. For example, affiliation information can comprise information related to an organization, company, club, group, association, and/or the like. As an example, a data value comprising affiliation information can comprise a affiliation network domain (e.g., "DOMAIN:company.com"). As a further example, affiliation information can comprise general office telephone numbers, affiliation addresses, and the like. In one aspect, data groups that contain the same affiliation information might not be viewed as equivalent based on the affiliation information since the data groups likely represent two distinct contacts who are affiliated (e.g., work as employees with the company).

In one aspect, the information sources 108 can receive and/or retrieve information from one or more locations. For example, the information sources 108 can retrieve information from a series of documents (e.g., web pages) through a document crawler (e.g., web crawler). The information sources 108 can comprise, for example, telephone directory databases comprising names, addresses, and/or telephone numbers. In another aspect, an information source 108 can comprise a user interface configured to allow users to provide information related to the users. For example, the user interface can comprise a contact organization system.

In one aspect, the network 106 can comprise a packet switched network, a non-packet switched network, or combination of both. The network 106 can comprise network adapters, switches, routers, and the like connected through wireless links (e.g., radio frequency, satellite; or physical links (e.g., fiber optic cable, coaxial cable, Ethernet cable). In one aspect, the network 106 can be configured to provide communication from telephone, cellular, modem, and/or other electronic devices to and throughout the system 100.

In one aspect, the computing device 102 can comprise a receiving unit 110 configured to receive information from the information sources 108. In another aspect, the receiving unit 110 can also receive information from the user device 104 or a storage unit 113. In one aspect, the information sources 108 can comprise additional user devices 104. The receiving unit 110 can request information from the information source 108 and/or the user device 104.

In one aspect, the computing device 102 can comprise a format unit 112 configured to format the information. For example, the format unit 112 can normalize (e.g., canonicalize, convert) the information so that the information is in a uniform format. For example, data values can be converted to handles and data groups can be converted to tuples. In one aspect, the information sources 108 can store the information in different formats from other information sources 108. Additionally, one information source 108 can store information in a variety of formats. Accordingly, the format unit 112 can process the information such that the information is in a uniform format for later processing of the information.

In one aspect, the computing device 102 can comprise an association unit 114 configured to associate data groups. For example, the data groups can be associated based on a value in one data group being equivalent to a value of another data group. For example, the same value can be located in more than one data group. In one aspect, the association unit 114 can be configured to associate the data groups by iteratively performing a union operation on at least two data groups.

The following is an illustration of how the association unit 114 can be configured to associate data groups. An example association process can proceed as a sequence of iterations. An iteration can comprise, for example, one or more of the following steps: a flatten step, a group step, and a union step in one aspect, the flatten step can comprise generating a list of key values comprising each of the one or more values in the data groups. In one aspect, generating the list of key values can comprise generating a set of data groups that contains N data values as N identical tuples, each tuple of the form<h,T>, where h is a handle in tuple T.

In one aspect, the group step can comprise generating, for each key value, a list of data groups that comprise the key value. For example, a new tuple can be generated for each handle h output by the flatten step. These new tuples can have the form <h, $\{T_1, \ldots, T_n\}$>, where h is in all $T_i$.

In one aspect, the union step can comprise generating, for each list of data groups, an additional data group comprising each of the values of the data groups of the list of data groups. For example, the union step can comprise determining a set union of each set of tuples $\{T_1, \ldots, T_n\}$. In one aspect, the union step can comprise three stages: an initial stage that operates on subsets of the input, an intermediate stage that processes the output of the initial stages, and a final stage that processes all of the results of the intermediate stage.

In one aspect, the flatten step, group step, and union step can be performed iteratively. For example, these steps can be performed until a threshold is met and/or exceeded. In some implementations, an iteration can comprise performing one, two, or all three of the flatten step, group step, and union step. Additionally, other steps can be performed as part of the iteration. In one aspect, the result of an iteration can be used as input for a subsequent iteration. After the association unit 114 completes the association process, the association unit 114 can identify one or more equivalency relationships within the data groups. For example, the association unit 114 can create a unique equivalency identifier for a set of data groups associated together by the association unit 114.

In one aspect, the system 100 can comprise a storage device 113. In certain aspects, the computing device 102 can comprise the storage device 113. For example, the storage device 113 can comprise a database 115. In one aspect, the database 115 can be implemented as a distributed database. The database 115 can be configured to store the data groups. The database 115 can also be configured to store information associated with the data groups. For example, a variety of identifiers can be associated with data groups indicating the data groups' relationship to other data groups, affiliations, and the like. As a further example, the association unit 114 can store the equivalency identifier in the database 115 as an identifier associated with one or more data groups.

In one aspect, the computing device 102 can comprise a processing distribution unit 116 configured to distribute the data association process to a computing cluster 117. For example, the computing cluster can comprise a plurality of computing nodes 118. The processing distribution unit 116 can subdivide the association process into a plurality of processes that can be performed in parallel at the plurality of computing nodes 118. For example, the plurality of computing nodes can be organized as a computing cluster. In one aspect, the computing cluster can be configured to subdivide according to a MapReduce programming approach or other similar approaches. For example, a plurality of tasks can be mapped (e.g., assigned) to the plurality of computing nodes 118. The results of those tasks can be reduced (e.g., collected, received) by the computing device 102. As another example, one or more of the flatten step, group step, and group steps can be subdivided into a plurality of tasks to be performed on the plurality of computing nodes 118.

In one aspect, the computing device 102 can comprise a data control unit 120 configured to regulate the association process. At any step during an iteration, data values can be discarded by the data control unit 120. For example, some data values, such as "EMAIL:help@domain.com," may be in a large number of data groups. Data values associated with a large number of data groups can create problems for purposes of determining equivalency data groups. In one aspect, when a step executing on one computing node 118 identifies a data value that could create problems for determining equivalence, that computing node 118 can broadcast that data value to other computing nodes 118. Accordingly, these data values associated with a large number of data groups can be archived and reused in subsequent processing to identify these data values in other data groups.

In one aspect, the association unit 114 can be configured to associate data groups based on different types for data values. For example, the association unit 114 can perform an association process based on personal information, affiliation information, and/or the like. In one aspect, the association process can differ according to the type of data values on which the association is based.

As an illustration, an association process based on affiliation related data is described as follows. In one aspect, the association unit 114 can be configured to identify affiliations based on values in the data groups. The association unit 114 can identify affiliation information before other association processes (e.g., association based on personal information). In one aspect, the affiliation based association process can comprise a flatten step. In the flatten step, the association unit 114 can receive a set of data values and output a list of key values for each data group. The key values can comprise affiliation related data values. For example, the association unit 114 can list the affiliation related data values for each data group as key values. In one aspect, the affiliation based association process can comprise a group step. In the group step, the affiliation unit 114 can generate, for each key value, a list of data groups that comprise the key value. In one aspect, the affiliation based association process can comprise a union step. In the union step, the association unit 114 can output sets of data groups organized based on the data groups in the set having the same affiliation related data values.

In one aspect, the computing device 102 can comprise a suggestion unit 122. The suggestion unit 122 can be configured to provide suggestions to add data values from one data group to another data group. In one aspect, the suggestion unit 122 can receive and/or read information stored in the database 115. For example, the suggestion unit 122 can analyze associations of groups generated by the association unit 114. For example, the suggestion unit 122 can identify data groups comprising one or more equivalent (e.g., similar, identical) values. One of these identified data groups can comprise a data value not found in the other data group. Accordingly, the suggestion unit 122 can be configured to identify the data value not found in the other data group and provide that value as a suggested value to add to another data group. In one aspect, the suggestion unit 122 can be implemented at the user device 104 instead of at the computing device 102.

In one aspect, the suggestion unit 122 can provide the suggestion to a user device 104. For example, the user device 104 can comprise a social interface 124. The social interface 124 can be configured to provide management of a plurality of contacts (e.g., social contacts). For example, the social interface 124 can comprise an address book with contact information for the plurality of contacts. The social interface 124 can be implemented through a web browser, mobile device application, or other interface. The social interface 124 can store the contact information in a storage device 113. For example, the storage device 113 can comprise a database 115 configured for storing the contact information for a plurality of contacts. In one aspect, the user device 104 can comprise a suggestion unit 126.

In one aspect, an application of the methods described herein is to manage contact information, such as generating a composite address book entry based on several partial address book entries using approximate equivalence of partial identities. For example, the data groups can be address book entries and the data values can comprise contact information. Address book entries (e.g., data groups) can be associated together (e.g., by iteratively performing the flatten step, group step, and union step). If two address book entries are associated together (e.g., represent the same contact), data values found in one user's address book entry but missing from another user's address book entry can be suggested to the user missing the data values.

Figure 2:
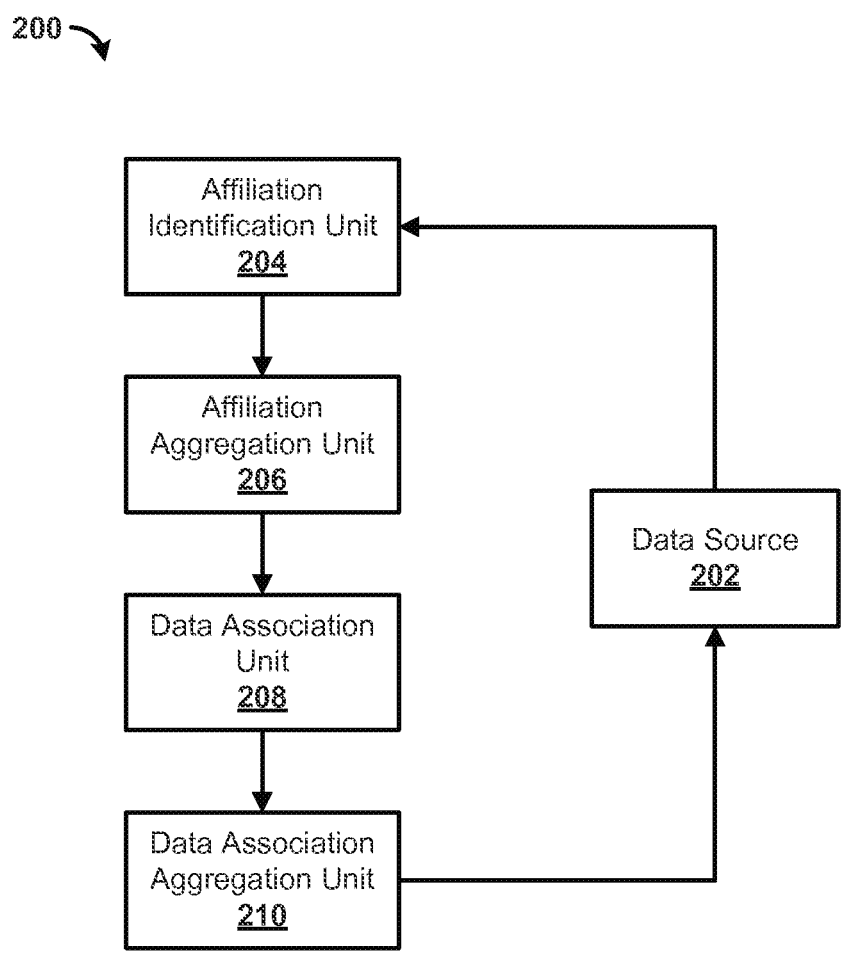
FIG. 2 is a block diagram illustrating an example process flow and accompanying system for analyzing information.

FIG. 2 is a block diagram illustrating an example process flow and accompanying system 200 for analyzing information. In one aspect, the process flow can be implemented through a plurality of units, modules, devices, and/or the like. In one aspect, the system 200 can comprise a data source 202. The data source 202 can store a plurality of data groups. The data groups can comprise a plurality of data values. For example, one or more of the data groups can comprise contact information associated with a contact. For example, a data group can comprise address, email, phone number, email address, web site, and the like of a particular contact. In one aspect, unique group identifiers can be associated with the data groups to distinguish the data groups from each other.

In one aspect, the system 200 can comprise an affiliation identification unit 204. The affiliation identification unit 204 can receive the data groups from the data source 202. The affiliation identification unit 204 can be configured to identify data values among the data groups that identify affiliation information. For example, a phone number, email, or other information can be determined as identifying an affiliation. As an illustration, a phone number with an extension can be used to identify a phone number associated with an affiliation. For example, an extension can be removed from the phone number thereby identifying a general phone number associated with an affiliation. As another illustration, an email can be used to identify a network domain associated with an affiliation. For example, an email such as "user@domain.com" can be removed of the user identifying information, thereby identifying a domain associated with an affiliation.

In one aspect, the system 200 can comprise an affiliation aggregation unit 206. In one aspect, the affiliation aggregation unit 206 can assign a unique affiliation identifier to the affiliation identified from the data groups. Then, the affiliation aggregation unit 206 can associate one or more unique company identifiers with the one or more data groups associated with an affiliation. For example, if the data group comprises a data value indicating that the data group is associated with the affiliation, then the data group can be associated with the unique identifier for the affiliation.

In one aspect, the system 200 can comprise a data association unit 208. The data association unit 208 can create a plurality of sets of data groups. The sets of data groups can be created based on equivalencies of data values of the data groups. For example, the data groups in a set of data groups can have common values, such as a phone number, email address, physical address, or other value. For example, a set of data groups can comprise data groups that all provide information for the same contact in an address book.

In one aspect, the system 200 can comprise a data association aggregation unit 210. The data association aggregation unit 210 can receive the plurality of sets of data groups. In one aspect, the data association aggregation unit 210 can assign unique set identifiers to the sets of data groups. The source aggregation unit 210 can provide the unique identifiers to the data source 202 such that one or more of the data groups stored in the data source 202 are associated with a set identifier.

In one aspect, the affiliation identification unit 204, affiliation aggregation unit 206, data association unit 208, and data association aggregation unit 210 can be configured to delegate processing to a plurality of computing nodes, such as the computing nodes 118 of FIG. 1. In one aspect, the affiliation identification unit 204, affiliation aggregation unit 206, data association unit 208, and data association aggregation unit 210 can be implemented in the association unit 114 of FIG. 1. In one aspect, the data values as well as associated identifiers can be provided to the data source 202 for storage.

Figure 3:
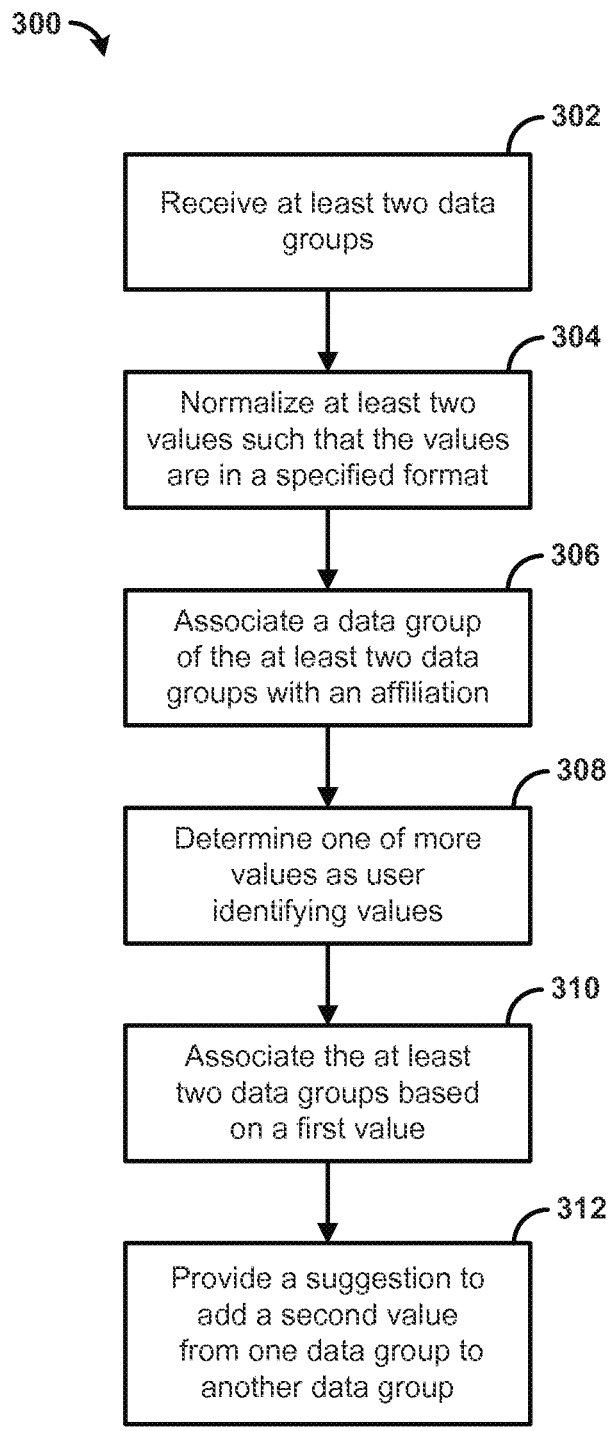
FIG. 3 is a flowchart illustrating another example method for analyzing information.

FIG. 3 is a flowchart illustrating another exemplary method 300 for analyzing information. In step 302, at least two data groups can be received. In one aspect, each of the at least two data groups can comprise one or more values. In one aspect, the one or more values can comprise at least one of a phone number, an email address, a web address, and a contact name. For example, the at least two data groups can be received from at least one of a social network, personal address book, and a database of contact information.

In step 304, at least two values of the one or more values can be normalized such that the at least two values are in a specified format. In step 306, a data group of the at least two data groups can be associated with an affiliation (e.g., company, organization, group, club) based on the one or more values of the data group. In step 308, values of the one of more values can be determined as user identifying values, in step 310, the at least two data groups can be associated based on a first value being in each of the at least two data groups. In one aspect, associating the at least two data groups can comprise performing a union operation on the at least two data groups. For example, the union operation can comprise generating a data group comprising each unique value of the one or more values of data groups of the at least two data groups. The data groups of the at least two data groups can be associated based on the data groups having an equivalent value or value in common. For example, the union operation can comprise the union step described herein. In one aspect, the union operation on the at least two data groups can be performed iteratively.

For example, associating the at least two data groups can be subdivided into a plurality of tasks performed on a plurality of computers. In step 312, a suggestion can be provided to add a second value from one data group of the at least two data groups to another data group of the at least two data groups. For example, the suggestion can be provided to a user when the user accesses an address book associated with the user.

Figure 4:
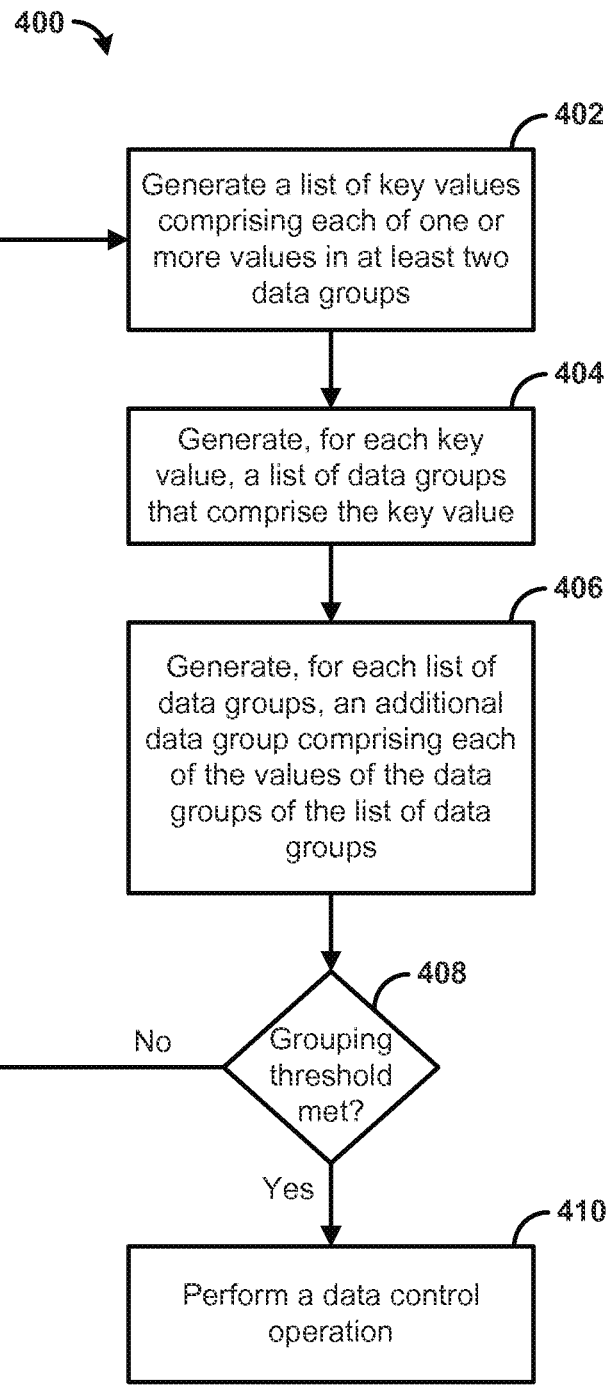
FIG. 4 is a flowchart illustrating another example method for analyzing information.

FIG. 4 is a flowchart illustrating another exemplary method 400 for analyzing information. In one aspect, the method 400 can be an implementation of step 310 of FIG. 3. For example, associating the at least two data groups can comprise performing, e.g., iteratively, the following steps.

In step 402, a list of key values comprising each of one or more values in at least two data groups can be generated. In step 404, for each key value, a list of data groups that comprise the key value can be generated. In step 406, for each list of data groups, an additional data group comprising each of the values of the data groups of the list of data groups can be generated. In one aspect, each of the additional data groups can be added to the at least two data groups.

In step 408, a determination can be made as to whether a grouping threshold is met. For example, the grouping threshold can comprise a specified number of iterations to perform steps 402, 404, and 408. However, the grouping threshold can be based on other criteria, such as number of data groups associated, size of data groups, and the like. If the grouping threshold is not met, the method 400 can proceed to step 402. If the grouping threshold is met, the method 400 can proceed to step 410.

In step 410, a data control operation can be performed. For example, a key value can be removed from the list of key values based on the key value being equivalent to a value in each of a specified number of data groups. As another example, one or more of the additional data groups can be removed based on the one or more additional data groups comprising a specified number of values. In another aspect, the data control operation can be performed during or between the iterative steps 402, 404, and 408.

Figure 5:
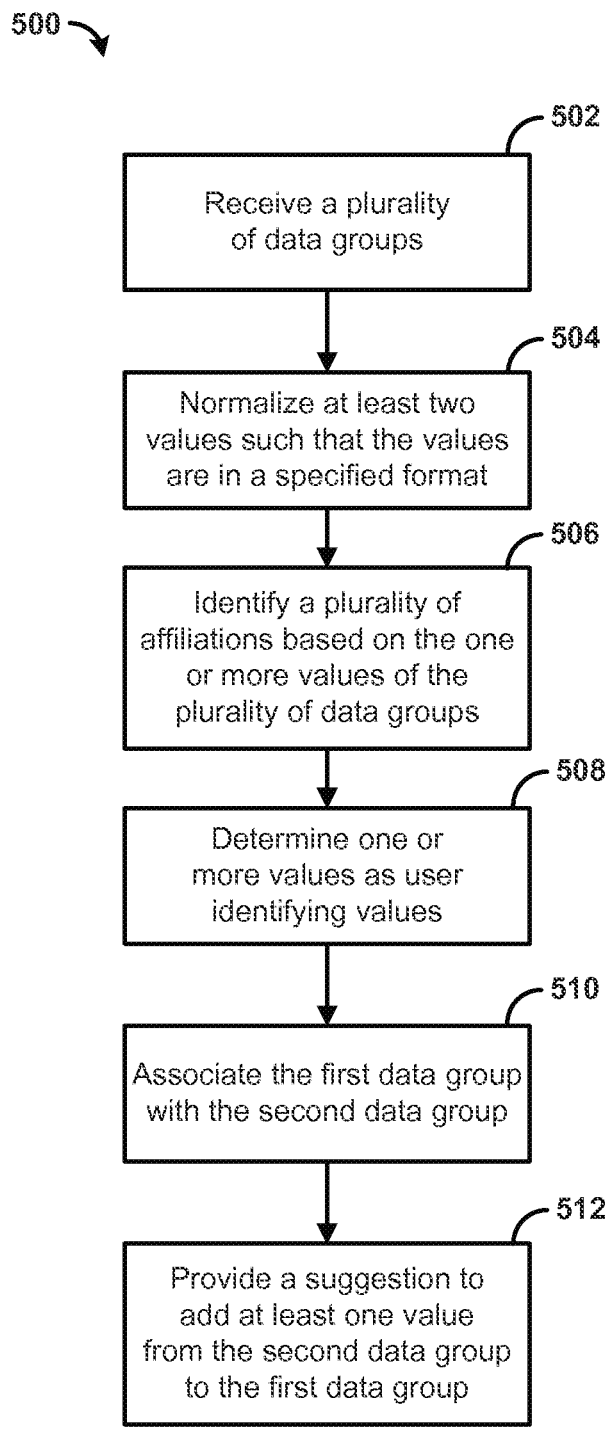
FIG. 5 is a flowchart illustrating another example method for analyzing information.

FIG. 5 is a flowchart illustrating another exemplary method 500 for analyzing information. In step 502, a plurality of data groups comprising a first data group and a second data group can be received. In one aspect, at least one of the data groups can comprise one or more values. In one aspect, the one or more values can comprise at least one of a phone number, an email address, a web address, and a contact name. For example, the plurality of data groups can be received from at least one of a social network, personal address book, and a database of contact information. In step 504, at least two values of the one or more values can be normalized such that the at least two values are in a specified format. In step 506, a plurality of affiliations can be identified based on the one or more values of the plurality of data groups. For example, an affiliation can be identified based on at least one of a domain name of an email address, a phone number associated with the organization, and an address associated with the affiliation. In step 508, values of the one of more values can be determined as user identifying values.

In step 510, the first data group can be associated with the second data group based on a value in the first data group being equivalent to a value in the second data group. For example, the associating the first data group with the second data group can be subdivided into a plurality of tasks performed on a plurality of computers. In one aspect, associating the first data group with the second data group can comprise iteratively performing the following steps (e.g., the steps of the method 400 of FIG. 4): generating a list of key values comprising each of the one or more values in the plurality data groups; generating, for each key value, a list of data groups that comprise the key value; and generating, for each list of data groups, an additional data group comprising each of the values of the data groups of the list of data groups. In one aspect, each of the additional data groups can be added to the plurality of data groups. These steps can be performed iteratively until a grouping threshold is met. For example, the grouping threshold can comprise a specified number of times to perform the iteration. In one aspect, a data control operation can be performed. For example, a key value can be removed from the list of key values based on the key value being equivalent to a value in each of a specified number of data groups. As another example, one or more of the additional data groups can be removed based on the one or more additional data groups comprising a specified number of values.

In step 512, a suggestion can be provided to a user associated with the first data group to add at least one value from the second data group to the first data group. In one aspect, the suggestion can be based on the first data group and the second data group being associated with the same affiliation of the plurality of affiliations. As an example, the suggestion can be provided to a user when the user accesses an address book associated with the user.

Figure 6:
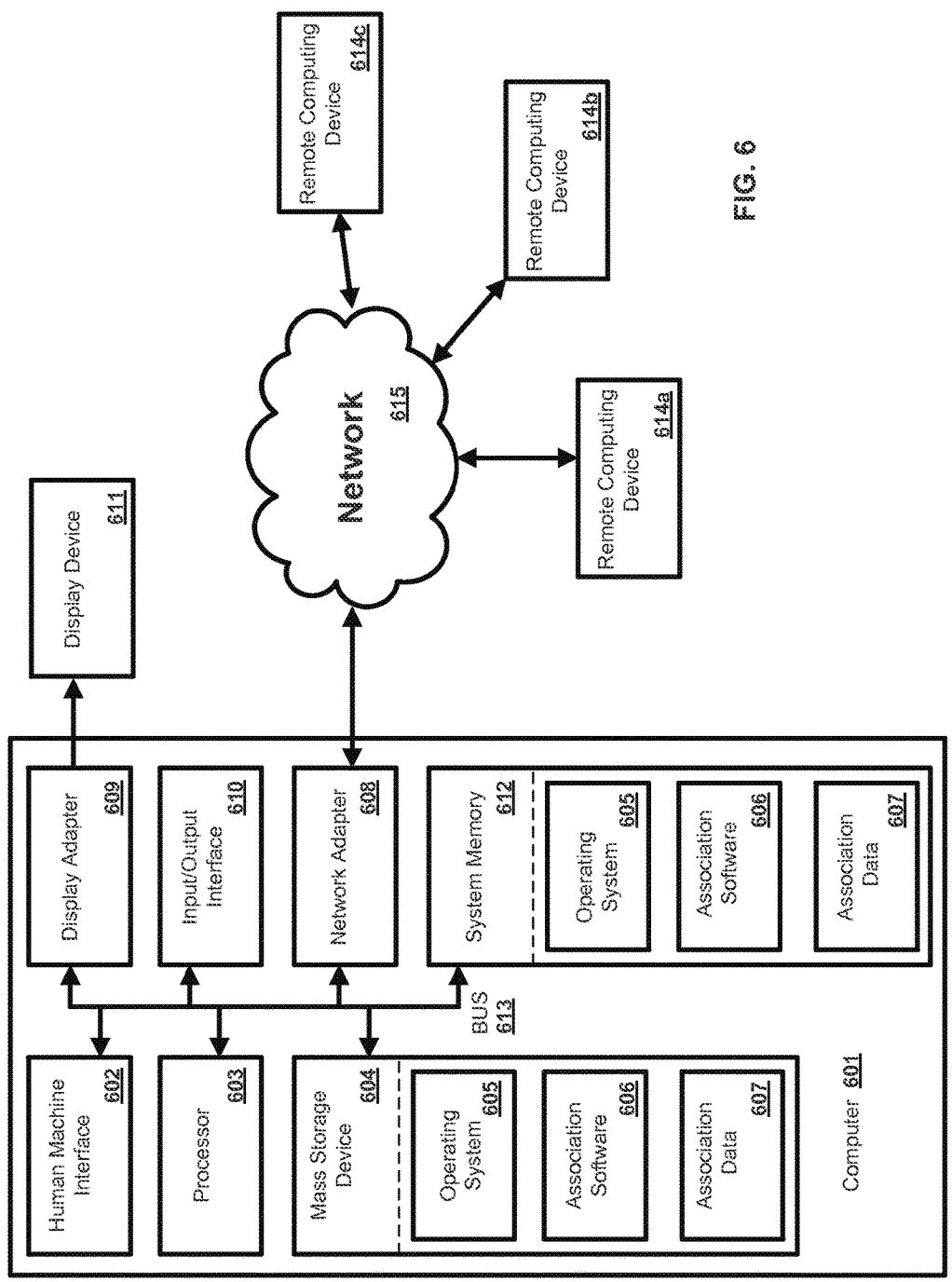
FIG. 6 is a block diagram illustrating an example computing system in which the present systems and methods can operate.

In an exemplary aspect, the methods and systems can be implemented on a computer 601 as illustrated in FIG. 6 and described below. By way of example, the computing device 102, computing nodes 118, and/or user device 104 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, association software 606, association data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media, that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as association data 607 and/or program modules such as operating system 605 and association software 606 that are immediately accessible to and/or are presently operated on by the processing unit 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and association software 606. Each of the operating system 605 and association software 606 (or some combination thereof) can comprise elements of the programming and the association software 606. Association data 607 can also be stored on the mass storage device 604. Association data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of association software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving at least two first data groups, wherein each of the at least two first data groups comprises one or more values;
   performing a flatten operation based on a first value being in each of the at least two first data groups, wherein the flatten operation comprises:
      extracting a plurality of key values from the at least two first data groups, wherein the plurality of key values are each of the one or more values in the at least two first data groups, and
      generating a second data group to associate with a key value of the plurality of key values, wherein the second data group comprises the one or more values from at least one of the at least two first data groups from which the key value was extracted;
   performing a group operation by generating, for each key value in the plurality of key values, a list of second data groups associated with each key value;
   performing a union operation by generating a third data group for the key value, wherein the third data group comprises each of the one or more values of the second data group of the list of second data groups associated with the key value;
   performing a data control operation on the at least two first data groups and the third data group; and
   providing a suggestion to add a second value from one data group of the at least two first data groups to another data group of the at least two first data groups, wherein the suggestion is based on the second value being absent from the another data group prior to the flatten operation.

2. The method of claim 1, wherein generating the third data group for the key value is performed iteratively.

3. The method of claim 1, wherein generating the third data group comprises generating the third data group as comprising each unique value of the one or more values of the second data groups of the list of second data groups associated with the key value.

4. The method of claim 1, further comprising subdividing into a plurality of tasks performed on a plurality of computers associating the at least two first data groups.

5. The method of claim 1, wherein performing the data control operation on the at least two first data groups and the third data group comprises removing a target key value from the plurality of key values based on the target key value being equivalent to a value in each of a specified number of first data groups of the at least two first data groups.

6. The method of claim 1, wherein performing the data control operation on the at least two first data groups and the third data group comprises removing the third data group based on the one or more third data group comprising a specified number of values.

7. The method of claim 1, wherein the one or more values comprise at least one of a phone number, an email address, a web address, or a contact name.

8. The method of claim 1, further comprising normalizing at least two values of the one or more values such that the at least two values are in a specified format.

9. The method of claim 1, further comprising associating a data group of the at least two first data groups with an affiliation based on the one or more values of the data group.

10. The method of claim 1, wherein providing the suggestion comprises providing the suggestion to a user when the user accesses an address book associated with the user.

11. A method, comprising:
receiving a plurality of data groups of a first set comprising a first data group and a second data group, wherein each of the plurality of data groups comprises one or more values;
identifying a plurality of affiliations based on the one or more values of the plurality of data groups;
generating, iteratively, based on a value in the first data group being equivalent to a value in the second data group, a list of key values comprising each of the one or more values in the plurality of data groups;
generating, iteratively, based on the value in the first data group being equivalent to the value in the second data group, for a key value of the list of key values, one or more data groups of a second set that comprise the one or more values of a data group of the first set from which the key value is generated;
generating, iteratively, based on the value in the first data group being equivalent to the value in the second data group, for the key value, a data group of a third set comprising each unique value of the one or more data groups of the second set generated for the key value;
performing a data control operation on the first data group, the second data group, and the data group of the third set that is associated with a target key value equivalent to the one or more values of the first data group and the second data group; and
providing a suggestion to a user associated with the first data group to add at least one value from the second data group to the first data group, wherein the suggestion is based on the first data group and the second data group being associated with a same affiliation of the plurality of affiliations and the at least one value from the second data group is absent from the first data group prior to generating the list of key values comprising each of the one or more values in the plurality of data groups.

12. The method of claim 11, wherein identifying the plurality of affiliations based on the one or more values of the plurality of data groups comprises identifying an affiliation based on at least one of a domain name of an email address, a phone number associated with an organization, and an address associated with the organization.

13. The method of claim 11, wherein receiving the plurality of data groups comprises receiving the plurality of data groups from at least one of a social network, a personal address book, or a database of contact information.

14. The method of claim 11, further comprising subdividing into a plurality of tasks performed on a plurality of computers associating the first data group with the second data group.

15. The method of claim 11, wherein performing the data control operation on the first data group, the second data group, and the data group of the third set that is associated with the target key value equivalent to the one or more values of the first data group and the second data group comprises removing the target key value from the list of key values based on the target key value being equivalent to a value in each of a specified number of data groups of the first set.

16. The method of claim 11, wherein performing the data control operation on the first data group, the second data group, and the data group of the third set that is associated with the target key value equivalent to one or more values of the first data group and the second data group comprises removing one or more data groups of the third set based on the one or more data groups of the third set comprising a specified number of values.

17. The method of claim 11, wherein the one or more values comprise at least one of a phone number, an email address, a web address, or a contact name.

18. The method of claim 11, further comprising normalizing at least two values of the one or more values such that the at least two values are in a specified format.

19. The method of claim 4, further comprising:
identifying, at a first computer, a problematic value of the one or more values in a task of the plurality of tasks performed on the plurality of computers; and
transmitting a discard message comprising the problematic value to one or more computers of the plurality of computers.

20. The method of claim 14, further comprising:
identifying, at a first computer, a problematic value of the one or more values in a task of the plurality of tasks performed on the plurality of computers; and
transmitting a discard message comprising the problematic value to one or more computers of the plurality of computers.

* * * * *